United States Patent
Gines Marin et al.

(10) Patent No.: US 11,301,618 B2
(45) Date of Patent: Apr. 12, 2022

(54) AUTOMATIC DOCUMENT ASSISTANCE BASED ON DOCUMENT TYPE

(71) Applicant: Microsoft Technology Licensing, LLC, Redmond, WA (US)

(72) Inventors: Maria del Mar Gines Marin, Kirkland, WA (US); Alfredo R Arnaiz, Redmond, WA (US); Domenic J. Cipollone, Redmond, WA (US); Ali Taleghani, Seattle, WA (US); Kathryn V. J. Sullivan, Bellevue, WA (US); Leah Joy Brown, Redmond, WA (US); Marion Kremer, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 60 days.

(21) Appl. No.: 15/957,427

(22) Filed: Apr. 19, 2018

(65) Prior Publication Data

US 2019/0138574 A1     May 9, 2019

Related U.S. Application Data

(60) Provisional application No. 62/582,215, filed on Nov. 6, 2017, provisional application No. 62/582,219, filed
(Continued)

(51) Int. Cl.
*G06F 40/166*     (2020.01)
*G06Q 10/10*     (2012.01)
(Continued)

(52) U.S. Cl.
CPC .......... *G06F 40/166* (2020.01); *G06F 3/0482* (2013.01); *G06F 16/148* (2019.01);
(Continued)

(58) Field of Classification Search
CPC ...... G06F 16/285; G06F 16/337; G06F 16/93; G06F 16/23; G06F 16/2291;
(Continued)

(56) References Cited

U.S. PATENT DOCUMENTS 5,873,107 A     2/1999     Borovoy et al.
6,757,674 B2     6/2004     Wiens et al.
(Continued)

OTHER PUBLICATIONS

"Final Office Action issued in U.S. Appl. No. 15/870,323", dated Jun. 28, 2019, 12 Pages.
(Continued)

*Primary Examiner* — Kyle R Stork
(74) *Attorney, Agent, or Firm* — Schwegman Lundberg & Woessner, P.A.

(57) ABSTRACT

Systems and methods may be used to display document critiques on a display device. A method may include receiving information including a document type of a document. The method may include determining a set of critiques for use with the document type, the set of critiques including a critique specific to the document type. The method may include providing, on a display, feedback within the document, including a visual indication on a user interface presenting the document, based on the set of critiques, for text within the document.

20 Claims, 5 Drawing Sheets

Related U.S. Application Data on Nov. 6, 2017, provisional application No. 62/582,240, filed on Nov. 6, 2017, provisional application No. 62/582,224, filed on Nov. 6, 2017.

(51) Int. Cl.

| | |
|---|---|
| *G06F 40/106* | (2020.01) |
| *G06F 40/117* | (2020.01) |
| *G06F 40/253* | (2020.01) |
| *G06F 40/279* | (2020.01) |
| *G06F 16/93* | (2019.01) |
| *G06F 3/0482* | (2013.01) |
| *G06F 16/28* | (2019.01) |
| *G06F 16/23* | (2019.01) |
| *G06F 16/14* | (2019.01) |
| *G06F 16/21* | (2019.01) |
| *G06F 16/22* | (2019.01) |
| *G06F 16/35* | (2019.01) |
| *G06F 16/335* | (2019.01) |
| *G06F 16/31* | (2019.01) |
| *G06Q 10/06* | (2012.01) |
| *G06Q 50/00* | (2012.01) |
| *G06F 16/25* | (2019.01) |
| *G06K 9/00* | (2022.01) |

(52) U.S. Cl.
CPC ........ *G06F 16/211* (2019.01); *G06F 16/2291* (2019.01); *G06F 16/23* (2019.01); *G06F 16/258* (2019.01); *G06F 16/285* (2019.01); *G06F 16/313* (2019.01); *G06F 16/337* (2019.01); *G06F 16/35* (2019.01); *G06F 16/93* (2019.01); *G06F 40/106* (2020.01); *G06F 40/117* (2020.01); *G06F 40/253* (2020.01); *G06F 40/279* (2020.01); *G06K 9/00463* (2013.01); *G06K 9/00483* (2013.01); *G06Q 10/06311* (2013.01); *G06Q 10/10* (2013.01); *G06Q 10/1053* (2013.01); *G06Q 50/01* (2013.01)

(58) Field of Classification Search
CPC ...... G06F 16/313; G06F 16/35; G06F 16/148; G06F 16/211; G06F 16/258; G06F 3/0482; G06F 17/212; G06F 17/218; G06F 17/274; G06F 17/2765; G06F 40/166; G06F 40/16; G06F 440/117; G06F 40/253; G06F 40/279; G06K 9/00463; G06K 9/00483; G06Q 10/06311; G06Q 10/10; G06Q 10/1053; G06Q 50/01; G06Q 10/01
See application file for complete search history.

(56) References Cited

U.S. PATENT DOCUMENTS

| | | |
|---|---|---|
| 7,149,347 B1 | 12/2006 | Wnek |
| 7,584,103 B2 | 9/2009 | Fritsch et al. |
| 8,171,015 B2 | 5/2012 | Jarboe et al. |
| 8,229,883 B2 | 7/2012 | Brauer et al. |
| 8,438,474 B1 | 5/2013 | Lloyd |
| 8,479,094 B2 | 7/2013 | Fouts |
| 8,498,990 B2 | 7/2013 | Heber |
| 8,620,079 B1 | 12/2013 | Rubio et al. |
| 8,640,251 B1 | 1/2014 | Lee et al. |
| 8,688,448 B2 | 4/2014 | Peters et al. |
| 8,713,007 B1 | 4/2014 | Korolev et al. |
| 9,171,072 B2 | 10/2015 | Scholtes et al. |
| 9,183,289 B2 | 11/2015 | Pulfer et al. |
| 9,218,083 B2 | 12/2015 | Tseng et al. |
| 9,235,812 B2 | 1/2016 | Scholtes |
| 9,239,876 B2 | 1/2016 | Kraley |
| 9,286,290 B2 | 3/2016 | Allen et al. |
| 9,286,548 B2 | 3/2016 | Kannan et al. |
| 9,361,377 B1 | 6/2016 | Azari et al. |
| 9,367,537 B2 | 6/2016 | Dua et al. |
| 9,372,858 B1 | 6/2016 | Vagell et al. |
| 9,563,622 B1 | 2/2017 | Anderson |
| 9,767,165 B1 | 9/2017 | Tacchi et al. |
| 10,078,688 B2 | 9/2018 | Kolotienko et al. |
| 10,114,889 B2 | 10/2018 | Han et al. |
| 10,152,648 B2 | 12/2018 | Filimonova |
| 10,318,564 B2 | 6/2019 | Chalabi et al. |
| 10,346,382 B1* | 7/2019 | Voytko .......... G06F 16/23 |
| 10,354,188 B2 | 7/2019 | Chalabi et al. |
| 10,467,507 B1* | 11/2019 | Hao .......... G06K 9/66 |
| 10,565,523 B2 | 2/2020 | Luo et al. |
| 10,579,716 B2 | 3/2020 | Gines Marin et al. |
| 2002/0065852 A1 | 5/2002 | Hendrickson et al. |
| 2005/0125746 A1 | 6/2005 | Viola et al. |
| 2005/0138079 A1 | 6/2005 | Liu et al. |
| 2006/0036599 A1 | 2/2006 | Glaser et al. |
| 2008/0059448 A1 | 3/2008 | Chang et al. |
| 2008/0077558 A1 | 3/2008 | Lawrence et al. |
| 2008/0114724 A1 | 5/2008 | Indeck et al. |
| 2008/0114725 A1 | 5/2008 | Indeck et al. |
| 2009/0113351 A1 | 4/2009 | Tomizawa et al. |
| 2009/0276415 A1 | 11/2009 | Dane |
| 2010/0088676 A1 | 4/2010 | Yuan et al. |
| 2010/0114899 A1* | 5/2010 | Guha .......... G06F 16/9535 |
| | | 707/741 |
| 2010/0180198 A1* | 7/2010 | Iakobashvili ......... G06F 40/232 |
| | | 715/257 |
| 2010/0191748 A1* | 7/2010 | Martin .......... G06F 16/355 |
| | | 707/750 |
| 2012/0016805 A1* | 1/2012 | Graupner .......... G06Q 10/06 |
| | | 705/342 |
| 2012/0089629 A1* | 4/2012 | Koll .......... G06F 16/3322 |
| | | 707/760 |
| 2012/0117082 A1 | 5/2012 | Koperda et al. |
| 2012/0137367 A1 | 5/2012 | Dupont et al. |
| 2012/0151386 A1 | 6/2012 | Sun et al. |
| 2012/0265759 A1 | 10/2012 | Bergeron et al. |
| 2012/0290926 A1 | 11/2012 | Kapadia et al. |
| 2012/0310868 A1 | 12/2012 | Martins |
| 2013/0014026 A1* | 1/2013 | Beringer .......... G06Q 10/06311 |
| | | 715/753 |
| 2013/0018904 A1 | 1/2013 | Mankala et al. |
| 2013/0060560 A1 | 3/2013 | Mahkovec et al. |
| 2013/0124193 A1 | 5/2013 | Holmberg |
| 2013/0185050 A1* | 7/2013 | Bird .......... G06F 16/3329 |
| | | 704/2 |
| 2013/0198599 A1 | 8/2013 | Kumar et al. |
| 2013/0226927 A1 | 8/2013 | Verma et al. |
| 2013/0325463 A1 | 12/2013 | Greenspan et al. |
| 2013/0325860 A1 | 12/2013 | Howard |
| 2014/0033010 A1 | 1/2014 | Richardt et al. |
| 2014/0046954 A1* | 2/2014 | MacLean .......... G06F 40/137 |
| | | 707/748 |
| 2014/0052658 A1 | 2/2014 | Wehrle et al. |
| 2014/0129573 A1 | 5/2014 | Dewaal |
| 2014/0165001 A1* | 6/2014 | Shapiro .......... G06F 16/54 |
| | | 715/811 |
| 2014/0265294 A1 | 9/2014 | Lenhard et al. |
| 2014/0348396 A1 | 11/2014 | Laaser et al. |
| 2015/0058349 A1 | 2/2015 | Ramnani et al. |
| 2015/0095016 A1* | 4/2015 | Karres .......... G16H 10/20 |
| | | 704/9 |
| 2015/0222665 A1 | 8/2015 | Eberlein et al. |
| 2015/0317610 A1 | 11/2015 | Rao et al. |
| 2016/0006715 A1 | 1/2016 | Lee |
| 2016/0041957 A1 | 2/2016 | Finsterwald et al. |
| 2016/0048936 A1* | 2/2016 | Perkowski .......... G06Q 50/184 |
| | | 705/310 |
| 2016/0055376 A1 | 2/2016 | Koduru |
| 2016/0103824 A1 | 4/2016 | Zupancic |
| 2016/0154892 A1 | 6/2016 | Carrier et al. |
| 2016/0353182 A1 | 12/2016 | Hellier et al. |

(56) References Cited

U.S. PATENT DOCUMENTS

| | | | |
|---|---|---|---|
| 2016/0378741 A1* | 12/2016 | Mullins | G06F 40/177 715/227 |
| 2017/0052950 A1 | 2/2017 | Danielyan et al. | |
| 2017/0076151 A1 | 3/2017 | Roy et al. | |
| 2017/0131974 A1 | 5/2017 | Balasubramanian et al. | |
| 2017/0300863 A1 | 10/2017 | Wang et al. | |
| 2018/0007099 A1 | 1/2018 | Ein-gil et al. | |
| 2018/0144042 A1 | 5/2018 | Sheng et al. | |
| 2018/0239959 A1 | 8/2018 | Bui et al. | |
| 2018/0365325 A1 | 12/2018 | Gireesha et al. | |
| 2019/0034083 A1 | 1/2019 | Cherubini et al. | |
| 2019/0069957 A1* | 3/2019 | Barral | A61B 34/20 |
| 2019/0138580 A1 | 5/2019 | Taleghani et al. | |
| 2019/0138609 A1 | 5/2019 | Taleghani et al. | |
| 2019/0138610 A1 | 5/2019 | Taleghani et al. | |
| 2019/0138611 A1 | 5/2019 | Gines marin et al. | |
| 2019/0138649 A1 | 5/2019 | Sullivan et al. | |

OTHER PUBLICATIONS

"Novoresume—The Professional Résumé Builder You Deserve", Retrieved from https://novoresume.com/?no-redirect, Oct. 4, 2017, 11 Pages.

"The Parser Interface", Retrieved from https://web.archive.org/web/20100523172246/https:/tika.apache.org/0.7/parser.html, May 23, 2010, 6 Pages.

"Non Final Office Action Issued in U.S. Appl. No. 15/870,323", dated Jan. 11, 2019, 11 Pages.

Adikari, Shalinda, et al., "Identifying Fake Profiles in Linkedin", Retrieved from https://pdfs.semanticscholar.org/bcc5/fc5682703c8aca22f81a220431cd368f4f30.pdf, Retrieved Date: Dec. 20, 2018, 15 Pages.

Singh. Amit, et al., "Prospect: A System for Screening Candidates for Recruitment", In Proceedings of 19th ACM international Conference on Information and knowledge Management, Oct. 26, 2010, pp. 659-668.

Christen, Peter, "Febrl—an Open Source Data Cleaning, Deduplication and Recordlinkage System with a Graphical User Interface", In Proceedings of the 14th ACM SIGKDD International Conference on Knowledge Discovery and Data Mining, Aug. 24, 2008, pp. 1065-1068.

Celik, Duygu, "Towards a Semantic-Based information Extraction System for Matching Resumes to to Job Openings", In Journal of Electrical Engineering and Computer Sciences, vol. 24, Issue 1, Jan. 1, 2016, pp. 141-159.

Bertino, Elisa, et al., "An Approach to Classify Semi-Structured Objects", In Proceedings of European Conference on Object-Oriented Programming, Nov. 19, 1999, pp. 416-440.

Denny, Joshua C., et al., "Evaluation of a Method to Identify and Categorize Section Headers in Clinical Documents", In Journal of the American Medical Informatics Association vol. 16, No. 6, Nov./Dec. 2009, 806-815.

Farrell, Stephen, et al., "Socially Augmenting Employee Profiles with People-Tagging", In Proceedings of the 20th Annual ACM Symposium on user Interface Software and Technology, Oct. 7, 2007, pp. 91-100.

Li, Furong, "Profiling Entities over Time 1-15 With Unreliable Sources", Retrieved from https://scholarbank.nus.edu.sg/bitstream/10635/135440/1/thesis_furong.pdf, Dec. 19, 2016, 166 Pages.

Ghufran, Mohammad, et al.,"Wikipedia-Based Extraction of key Information from Resumes", In Proceedings of 11th International Conference on Research Challenges in Information Science, May 10, 2017, 11 Pages.

Yu, Kun, et al., "Resume Information Extraction with Cascaded Hybrid Model", In Proceedings of the 43rd Annual Meeting on Association for Computational Linguistics, Jun. 25, 2005, pp. 499-506.

Martinez, Bee, "6 Sites to Build a Better Resume", Retrieved from https://bossedup.org/6-sites-to-build-a-better-resume/, Nov. 30, 2016, 5 Pages.

McGregor, Colin, "6 Document Classification", In White Paper of Oracle, Dec. 2003, 8 Pages.

Neshatian, Kourosh, et al., "Text Categorization and Classification in Terms and Classification in Terms of Multi-Attribute Concepts for Enriching Existing Ontologies", In Proceedings of Second Workshop on Information Technology and its Disciplines, 2004, 6 Pages.

"International Search Report and Written Opinion Issued in PCT Application No. PCT/US2018/057907", dated Feb. 12, 2019, 14 Pages.

"International Search Report and Written Opinion Issued in PCT Application No. PCT/US18/058064", dated Jan. 7, 2019, 13 Pages.

"International Search Report and Written Opinion Issued in PCT Application No. PCT/US2018/058061", dated Feb. 12, 2019, 14 Pages.

"International Search Report and Written Opinion Issued in PCT Application No. PCT/US2018/058062", dated Feb. 12, 2019, 15 Pages.

"International Search Report and Written Opinion Issued in PCT Application No. PCT/US2018/058071", dated Jan. 7, 2019, 13 Pages.

Prieto, Victor M., et al., "Detecting Linkedin Spammers and its Spam Nets", In International Journal of Advanced Computer Science and Applications vol. 4, Issue 9, 2013, 2013, pp. 189-199.

Raad, Elie, et al., "User Profile Matching in Mobile Social Networks", Retrieved from https://hal.archives-ouvertes.fr/hal-00643509/file/User_Profile_Matching_in_Social_Networks.pdf, Sep. 2010, 9 Pages.

Siting, Zheng, et al., "Job Recommender Systems", In Proceedings of 7th International Conference on Computer Science & Education, Jul. 14, 2012, pp. 920-924.

Zuo, Xin, "High Level Support For Distributed Computation in Weka", Retrieved from http://citeseerx.ist.psu.edu/viewdoc/download?doi=10.1.1.470.6625&rep=rep1&type=pdf, Aug. 2004, 56 Pages.

"Non Final Office Action Issued in U.S. Appl. No. 15/870,323", dated Nov. 15, 2019, 11 Pages.

"Notice of Allowance issued in U.S. Appl. No. 15/870,578", dated Oct. 7, 2019, 11 Pages.

Li, Furong, et al., "Profiling Entities over Time in the Presence of Unreliable Sources", IEEE Transactions on Knowledge and Data Engineering, vol. 29, No. 7, Jul. 2017, pp. 1522-1535.

"Non Final Office Action Issued in U.S. Appl. No. 15/870,521", dated Oct. 3, 2019, 11 Pages.

"Final Office Action Issued In U.S. Appl. No. 15/870,323", dated Apr. 16, 2020, 12 Pages.

"Notice of Allowance issued in U.S. Appl. No. 15/870,323", dated Jul. 8, 2020, 6 Pages.

"Non Final Office Action issued In U.S. Appl. No. 15/870,432", dated Apr. 2, 2020, 9 Pages.

"Notice of Allowance Issued in U.S. Appl. No. 15/870,432", dated Jul. 24, 2020, 8 Pages.

"Non Final Office Action issued In U.S. Appl. No. 15/870,618", dated Apr. 14, 2020, 9 Pages.

"Notice of Allowance Issued in U.S. Appl. No. 15/870,618", dated Aug. 4, 2020, 8 Pages.

"Office Action Issued in European Patent Application No. 18804462.2", dated Oct. 8, 2021, 7 Pages.

"Office Action Issued in European Patent Application No. 18807765.5", dated Oct. 7, 2021, 8 Pages.

"Office Action Issued in European Patent Application No. 18811970.5", dated Oct. 7, 2021, 8 Pages.

* cited by examiner

*← 200*

[FIRST NAME] [LAST NAME]

[Address]
[Phone]
[Email]
[Social Media Profile]
[Blog/Portfolio]

● OBJECTIVE — 202
I embrace change as a means to expand business and remain competitive.
>>> to ● EDUCATION
[Degree Title] | [School]
[DATES FROM] – [TO]
Honors

[Degree Title] | [School]
[DATES FROM] – [TO]
Minor

● EXPERIENCE
[Job Title] | [Company]
[DATES FROM] – [TO]
Managed Projects — 204
Conducted an assessment of a Money Service Business (MSB) Operation.
>>> Assessed ● SKILLS — 206 — 208
- Identifying the gaps and working on continuous process improvements and streamlining the existing process.
  >>> Identifying the gaps, working on continuous process improvements, and streamlining the existing process
- I'm a digital artist (visual / music) with experience in many facets of production including ...
  >>> Digital
-

● ACTIVITIES
Leadership and volunteer activities

*FIG. 2*

AUTOMATIC DOCUMENT ASSISTANCE BASED ON DOCUMENT TYPE

CLAIM OF PRIORITY

This application claims the benefit of priority to U.S. Provisional Application No. 62/582,215, "ELECTRONIC DOCUMENT CONTENT AUGMENTATION", filed Nov. 6, 2017, U.S. Provisional Application No. 62/582,219, "ELECTRONIC DOCUMENT CONTENT EXTRACTION AND DOCUMENT TYPE DETERMINATION", filed Nov. 6, 2017, U.S. Provisional Application No. 62/582,224, "ELECTRONIC DOCUMENT CONTENT CLASSIFICATION AND DOCUMENT TYPE DETERMINATION", filed Nov. 6, 2017, and U.S. Provisional Application No. 62/582,240, "ELECTRONIC DOCUMENT SUPPLEMENTATION WITH ONLINE SOCIAL NETWORKING INFORMATION", filed Nov. 6, 2017, all of which are incorporated by reference herein in their entirety.

BACKGROUND

Spelling and grammar checkers for text documents have existed for decades. Improvements have been made over time to more accurately check spelling and grammar for errors, as well as to assess more rules and deeper dictionaries. However, the spelling and grammar checkers presented in a user interface for a document are generic and typically are applied to any type of document, which may conflict with a purpose of a particular type of document.

Some solutions ask a user to manually indicate a type of document, only accept a single type of document, or rely on the document being created from a particular template file. While certain documents types require specific language, in terms of formality, style, etc., proofing tools are typically either generic or require people to identify the kind of checking they need, and are not changeable once selected.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2 illustrates an example document including example critiques in accordance with some embodiments.

DETAILED DESCRIPTION

Systems and methods for displaying document critiques on a display device, such as using a user interface, are described herein. Document critiques are suggestions for adding or deleting text or formatting, or other actions to be taken based on arrangement of text or formatting of text. Document critiques may be specific to a document type or set of document types, or universal, as described in more detail below. Document critiques may include changes based on rules, suggestions, recommendations, or the like The systems and methods described herein may use a document type to provide writing assistance to a user based on the type of document, such as after a document is classified into the document type. Many different types of documents may be covered, such as broad types (e.g., prose, essay, letter) or more specific types (e.g., resume, cover letter, recipe document, press release, etc.). Although a distinction between broad or specific types of documents may be made for convenience or speed of detection, classification, or application of critiques, no distinction need be made between broad and specific types of documents for implementing the systems and methods described herein.

In an example, after classification of a document type, the systems and methods described herein may suggest a specific set of critiques (e.g., proofing checks) that target the specific document type. The set of critiques may include widely applicable critiques, critiques specific to only that document type, or both. For example, widely applicable critiques may be applicable to all document types, some subset of document types, two document types, etc. Specific critiques may be applicable only to that document type.

In an example, the document type may be determined using natural language processing. For example, the contents of a document may be analyzed using natural language processing to understand enough about that content to determine the type/category of the document. This includes recognizing the type of content (for example: a name, an email address, a job title, etc.) and using that in conjunction with where the information is placed on the page (e.g., the name on a resume is typically at the top, along with other contact information). In an example, this classification may be performed throughout a user session (e.g., at intervals, continuously, etc.), while the user is editing or changing the document, or may occur as a one type attempt, such as on document open. A system provides for the classification of components of content of the electronic document as well as classification of the content of the electronic document as a whole.

Figure 1:
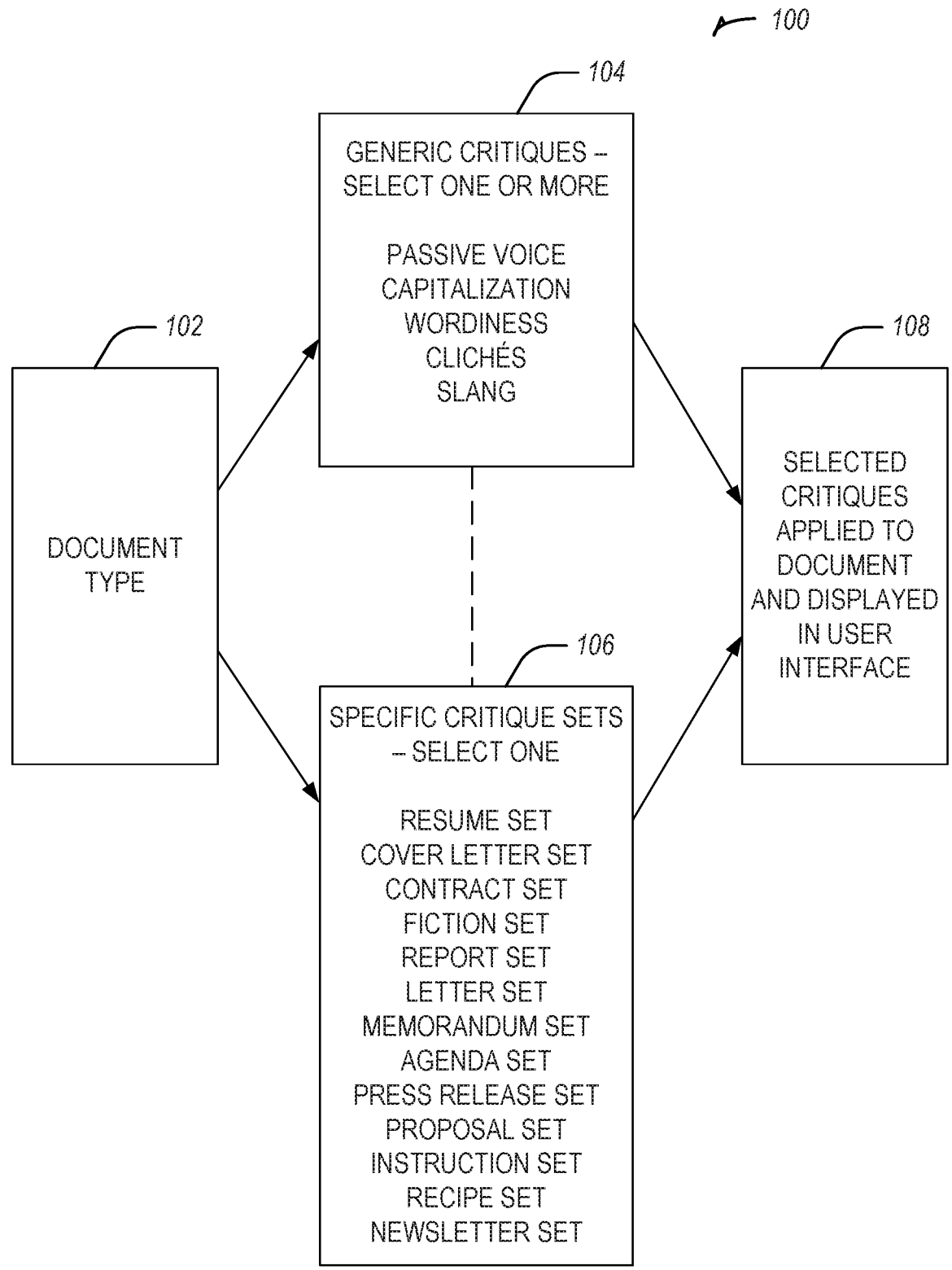
FIG. 1 illustrates a document classification and critique data flow diagram in accordance with some embodiments.

FIG. 1 illustrates a document classification and critique data flow diagram 100 in accordance with some embodiments. The flow diagram 100 includes a document with a document type, identified at 102. After the document type is identified, critiques are selected, such as generic critiques at 104 or specific critiques at 106. In order to show these critiques as independently selectable, they are split out at 104 and 106 in FIG. 1. In another example, a specific critique set may already include the generic critique or critiques for a particular document type. For example, a specific critique set may be preselected to include generic critiques and specific critiques for a document type.

In another example, generic critiques and specific critiques may be combined when a document type is identified. The generic critiques of 104 may be applied to more than one document type, whereas the specific critique sets of 106 may be applied to a single document type. The generic critiques may include one or more critiques, which may be selected for applicability to a document type. The specific critique sets of 106 may include one or more critiques that apply specifically to the document type.

The critiques, generic 104 or specific 106 may be applied to the document based on the document type 102, at 108.

The applied critiques may be displayed in a user interface displaying the document. For example, a critique may be used to identify a suggestion to a change to the document. The critique may be illustrated on the user interface by applying an indication to text suggested to be changed by the critique, such as a highlight, color change, underline (e.g., squiggly line under text), formatting change, or the like.

In an example, generic critiques may include grammar or style critiques or suggested changes, such as those related to passive voice, capitalization, wordiness, clichés, slang, or the like. Specific critique sets may apply to particular document types, such as a resume, cover letter, contract, fiction text, report, letter, memorandum, agenda, press release, proposal, instruction letter, recipe, newsletter, or the like.

In an example, a critique may be generated using grammar rules (e.g., punctuation conventions, word complexity, type of voice—active or passive, or the like). A critique may be generated based on professional input, such as recruiter interviews; internet search, analyzed documents, style recommendations, or the like. A critique may be generated based on past successful documents (e.g., a resume that resulted in a job offer, an accepted proposal, a litigated contract, a prize winning fiction story, essay, letter, etc.), or the like. In an example, a critique may be generated based on machine learning (e.g., trained using one or more of the above categories) or computer generated. For example, data analysis may be performed on previous documents, an interview with an expert may be conducted and used as training data, or past documents may be connected to a system for evaluating success (e.g., a talent recruiting database).

In an example, a critique for use in a set of critiques corresponding to a document type may be subject to a minimum threshold of acceptance by users before being included in the set of critiques. For example, the critique may be subject to a minimum flag acceptance rate (FAR), which indicates the number of times users accept the critique's suggested changes, and may be expressed as a percentage. In an example, a critique may be subject to a minimum FAR score, such as an overall FAR≥70%. In an example, a set of critiques for use on a document type may also be subject to additional thresholds, such as an overall FAR≥70% (e.g., for the set of critiques), a minimum FAR per critique in the set of critiques ≥60%, or a minimum FAR per specific critique ≥70%. In an example, these requirements may be measured within a particular document type.

At 108, applying the critiques to the document and displaying the critiques in the user interface may include applying or displaying the critiques throughout the document or applying or displaying the critiques to a portion of the document. In an example, the document type 102 may be applicable to only a portion of a document with a different document type on a different portion of a document, where each portion may have different critiques applied or displayed. In another example, one document type may apply to the entire document. In either of these examples, a document type may change (e.g., for the entire document, for a portion of a document with two or more portions having different document types, to a document previously having only one document type, where the a second document type is identified and the document is then portioned based on the change, or a document having two or more document types may be further subdivided into three or more document types, where portion delineation may change). When a document type changes (for an entire document or a portion of a document), new critiques may be applied (e.g., as selected from 104 or 106) to the text corresponding to the changed document type.

FIG. 2 illustrates an example document 200 including example critiques (202, 204, 206, and 208) in accordance with some embodiments. The example document 200 is a resume, and thus is classified as having a document type of resume. Other example documents with example document types may be used, the example document 200 resume is shown for illustration of critiques.

In an example, the example document shows visual indicators (202-208) of examples applied from a set of critiques to help ease the wordsmithing pains of the resume writing process. In the following examples, bolded text is used to identify words or a word with suggested changes and the suggested change itself. Example critiques include a style critique 202 for wordiness: "I embrace change as a means to expand business and remain competitive," is suggested to change to "to." An example critique includes a nominalization critique 204, where "Conducted an assessment of a Money Service Business" is suggested to change to "Assessed." Another style critique 206 may be used to correct for a conjunction overuse where, "Identifying the gaps and working on continuous process improvements and streamlining the existing process" is suggested to change to "Identifying the gaps, working on continuous process improvements, and streamlining the existing process." Another example critique includes a verbosity critique 208 to remove a first person reference to avoid verbosity, where "I'm a digital artist" is suggested to change to "Digital artist."

The examples shown in FIG. 2 illustrate general as well as specific critiques. For example, the wordiness of style critique 202 may be generic, or apply to more than one document type (e.g., essay, fiction, press release, etc.). The verbosity critique 208 may be applicable only to a resume document type, for example because a first person reference may only be an issue in a resume. Other examples are described below in Table 1.

TABLE 1

| Controlling Option | Resume Mode recommendation | Reason\|Example |
|---|---|---|
| Style: Passive Voice with Unknown Actor | on | Reason: Important to express agency in resumes. In addition, infrastructure was implemented to support the new platform. This project was completed on schedule. >>> Implementing infrastructure to support the new platform. Completed this project on schedule. |
| Style: Words Expressing | on | Reason: Avoid words that express uncertainty or lessen the impact of your statement |

TABLE 1-continued

| Controlling Option | Resume Mode recommendation | Reason\|Example |
|---|---|---|
| Uncertainty | | I created a marker cluster for leaflet that essentially groups similar points on the map under one SVG circle.<br>>>> groups |
| Style: Informal Language | on | Reason: Informal words and phrases are most appropriate for familiar, conversational settings. Ported into C and commented totally undocumented Z-80 assembly code driving an optical scanner and stepper motors for a quality-assurance machine for printing bank checks.<br>>>> undocumented |
| Style: Cliches | on | Good flags like cutting edge, by leaps and bounds, think outside the box . . . |
| Style: Disability Bias | on | Good flags and suggestions in resumes for "mental retardation", "handicapped students", "foreign and disabled people" etc. |
| Style: Passive Voice with Known Actor | on | Important to express agency in resumes. The functionality is validated by the experiments, showing DC link voltage and reactive power could be controlled effectively.<br>>>> The experiments validate the functionality |
| Style: Conjunction Overuse | on | Identifying the gaps and working on continuous process improvements and streamlining the existing process.<br>>>> Identifying the gaps, working on continuous process improvements, and streamlining the existing process. |
| Style: Slang | on | Reason: biz is informal<br>First steps in entrepreneurship launched design/build renovation biz for projects under construction.<br>>>> business |
| Style: Double Negation | on | Helpful although rare in full set of resumes. Flags in examples like "The project posed unique challenges in data-gathering as service users were not unlikely to have literacy issues, learning disabilities or language barriers."<br>>>> likely |

The following critique in Table 2 may be relevant for a resume document types and may be used generically or in other document types.

TABLE 2

| Scenario/Critiques | Description of Critique | Examples |
|---|---|---|
| Academic Degrees (to be professional) | Critique for incorrect academic degree expressions (e.g., singular/plural, upper/lowercase, 's) | Masters of Science, Masters in Fine Arts, Bachelors of Arts, bachelor of arts, Masters in Project Management<br>>>> Master of Science, Master of Fine Art, Bachelor of Arts, Master's degree in Project Management |

Resume-specific critiques (or other document type specific critiques or set of critiques) may appear in a user interface dialog box, such as one related to grammar settings. The dialog box may include options to turn on or off the automatic detection of document type or automatic application of critiques in a document.

The following critiques in Table 3 may be relevant for a resume document type only.

TABLE 3

| Scenario/Critiques | Description of Critique | Examples |
|---|---|---|
| Quantify where possible (to highlight accomplishments) | Flag vague quantifications and suggest providing specific numbers. No direct replacement suggestion because only the writer can provide the numbers. | Developed numerous database applications to automate various data conversion tasks Provided case management for many residents. |
| Remove Redundant Expressions (to save space) | Flag and remove superfluous expressions, like "Resume (title), Responsibilities include(d), Duties include(d), Job Duties, Proven ability in/to, References available upon request, as | Also responsible for developing data requirements, QA test plans, conversion |

TABLE 3-continued

| Scenario/Critiques | Description of Critique | Examples |
| --- | --- | --- |
| | many as, etc., and so on" | plans and database mapping.<br>>>> Developing, Developed |

An example document type may include a business proposal. The business proposal may use genetic critiques, such as clarity suggestions or conciseness suggestions, which may include not using jargon, adjective order, or adverb placement. In an example, the business proposal document type may correspond to specific critiques such as defining key terms in the document (e.g., implemented by flagging undefined key terms), flagging sections in the document that are too long, proposing summarizing points, or flagging hyperbolic language (e.g. "our awesome feature will double your sales!"), or the like.

Figure 3:
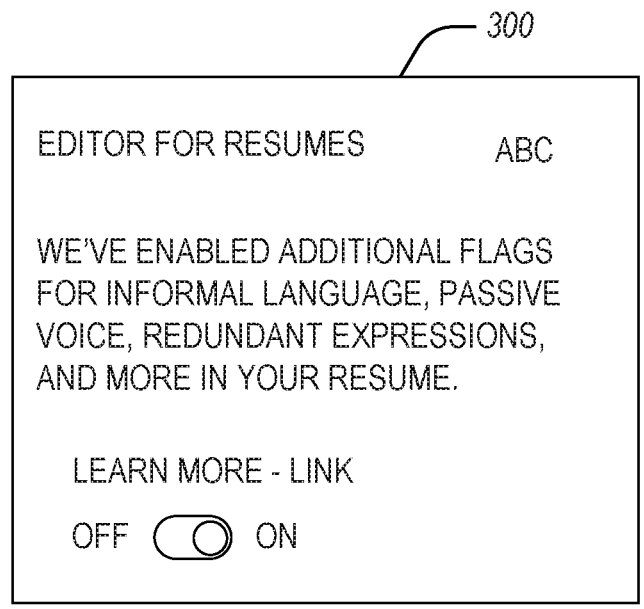
FIG. 3 illustrates an interactive user interface component for enabling critiques in accordance with some embodiments.

FIG. 3 illustrates an interactive user interface component 300 for enabling critiques in accordance with some embodiments. The interactive user interface component 300 allows a user to select to enable or disable automatic detection of a document type or automatic application of critiques for a document type within a document. The example interactive user interface component 300 shown in FIG. 3 is related specifically to a resume document type (e.g., corresponding to the example in FIG. 2). Other document types, when detected for a document or a portion of a document may appear instead of "Resume" in the interactive user interface component 300. In another example, the text within the interactive user interface component 300 may be more general and related to providing critiques for a yet to be detected document type.

In an example, the critiques may automatically turn on when a document type is detected, and the interactive user interface component 300 may be used to turn the critiques off. Whenever a new critique is offered, a category is displayed (e.g., resume, contract, cover letter, press release, etc.). The category with critiques may be based on the specific document type. When the critiques are applicable to text within the document, a specific user action may be associated and the user interface may display a particular type of identification (e.g., an underline of the text in a particular color).

When the user switches the interactive user interface component 300 toggle off, the document type specific critiques may be turned off. In an example, when any of the critiques would otherwise still be active (e.g., 'Slang' critique may be part of a more generic grammar critique set that is still turned on), these may be kept on. In a similar way, when the document is closed, and the user has not changed any grammar settings, the grammar settings may revert to a prior state. Even if the user turns the toggle off, the next time the user opens a document that is classified to a document type, the toggle may be turned on. For example, it may be assumed that the decision to turn the toggle off was a document or session specific action. In another example, turning the toggle off may permanently turn off the critiques or critiques for a current document type.

In an example, when a user makes personalized changes grammar or critique selections, actions of the document type critiques may be modified. For example, when a user turns on a specific critique, the specific critique may persist even when a document type corresponding critique set is applied (or when a document type changes). When a user turns off a critique that was turned on and is in a critique set corresponding to a document type, either a generic or type-specific critique, the critique may remain off, even if it would otherwise be in the set of critiques. The critique may be turned back on when the document is reopened, a document type changes for the document, in a new session, or on a different document having the document type.

Figure 4:
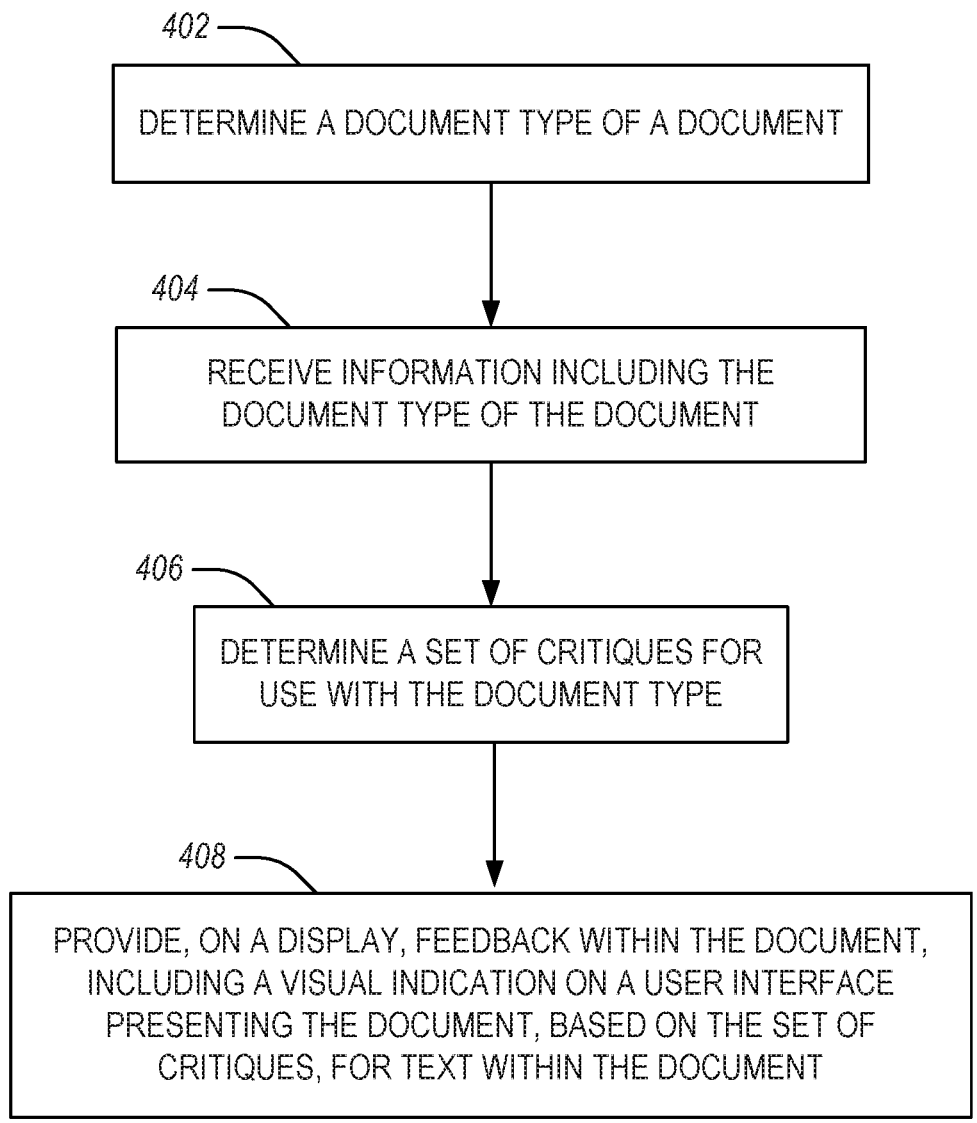
FIG. 4 illustrates a flowchart showing a technique for displaying document critiques at a display device accordance with some embodiments.

FIG. 4 illustrates a flowchart showing a technique 400 for displaying document critiques on a display device accordance with some embodiments. The technique 400 includes an operation 402 to determine a document type of a document. The document type may be identified based on text in the document. The technique 400 includes an operation 404 to receive, such as at a processor of the display device, information including the document type of the document. In an example, operation 404 may be are performed without user input. In an example, the set of critiques are automatically activated without user input.

The technique 400 includes an operation 406 to determine a set of critiques corresponding to the document type (e.g., applicable to the text in the document). In an example, the set of critiques includes a generic critique, a critique specific to the document type, or both. In an example, the set of critiques omits at least one generic critique (e.g., does not use all generic critiques). The set of critiques may include a passive voice critique, a capitalization critique, a wordiness critique, a cliché critique, a slang critique, a punctuation convention critique, a word complexity critique, a nominalization critique, an informal language critique, a conjunction overuse critique, a double negation critique, a redundant expression critique, a first person reference critique (which may correspond only to the resume document type, in an example), or the like. In an example, critiques corresponding only to the resume document type may include superfluous expressions, unsuitable expressions, vague quantifiers, or vague verbs. In an example, critiques corresponding only to a business proposal resume type may include key terms undefined, sections that are too long, or hyperbolic/advertising language.

The set of critiques may be generated based on past documents of the document type, such as being based on an expert analysis of the past documents, objective success of the past documents, machine learning using the past documents, or the like. The set of critiques may be automatically applied to the text in the document when activated. Activation of the set of critiques may include automatic activation (e.g., on by default) or user activation (e.g., the user interface may include a user selectable toggle to activate or deactivate the critiques).

The technique 400 includes an operation 408 to provide, on a display (e.g., using a user interface), feedback within the document, including a visual indication on a user interface presenting the document, based on the set of critiques, for text within the document. The feedback may be provided in response to the set of critiques being activated (e.g., automatically or by a user). The user interface may include a user selectable toggle to turn the feedback on or off. The user interface may display the document type. In an example, the document type may be a resume, business proposal, newsletter, cover letter, contract, report, letter, memorandum, agenda, press release, proposal, or the like.

Figure 5:
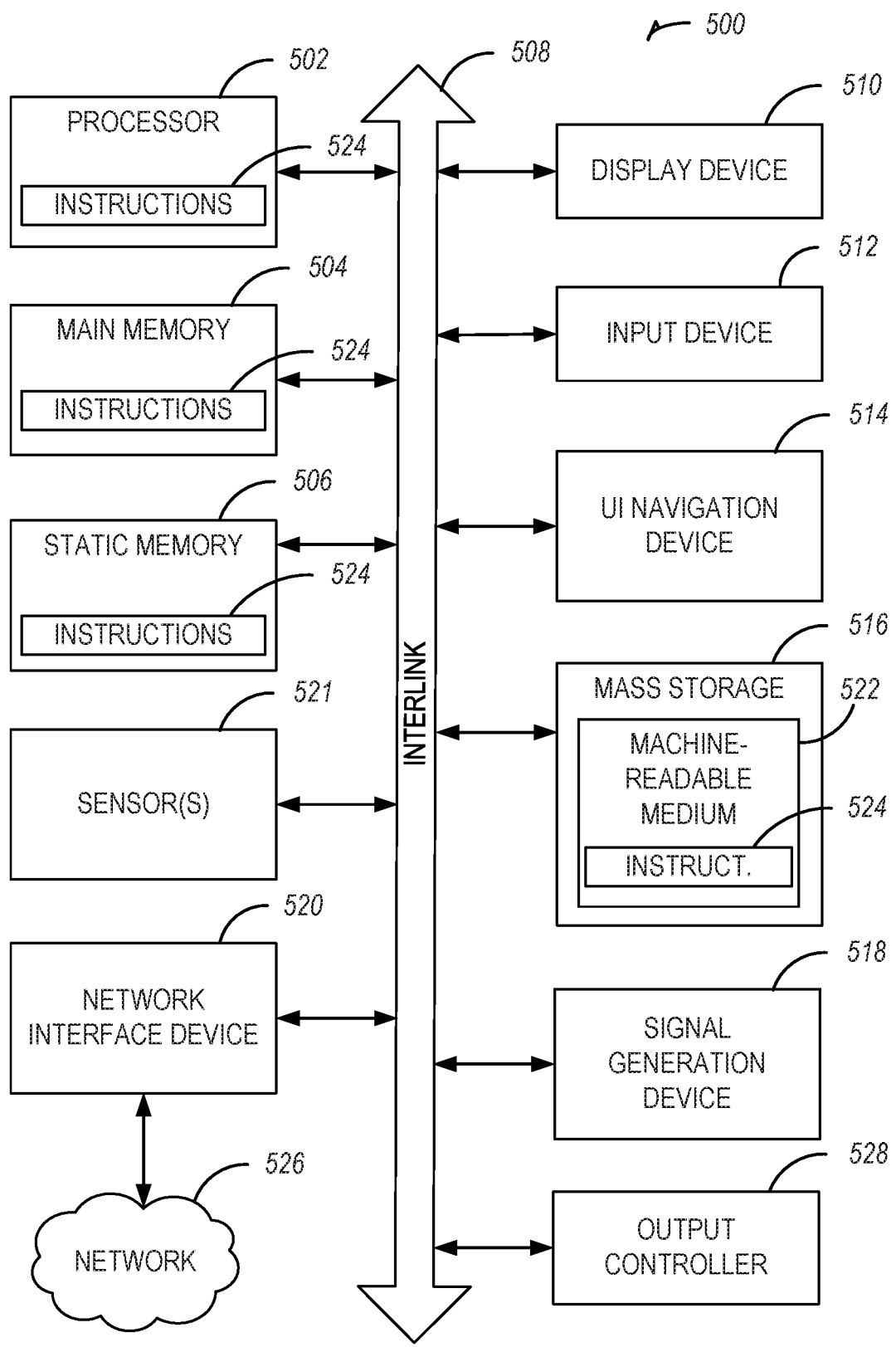
FIG. 5 illustrates generally an example of a block diagram of a machine upon which any one or more of the techniques discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Each of these non-limiting examples may stand on its own, or may be combined in various permutations or combinations with one or more of the other examples.

Example 1 is a method for displaying document critiques on a display device, the method comprising: receiving, at a processor of the display device, information including a document type of a document, the document type identified based on text in the document; determining, using the processor, a set of critiques, corresponding to the document type, the set of critiques automatically applied to the text in the document when activated and the set of critiques including a critique specific to the document type; providing, on a display of the display device in response to the set of critiques being activated, feedback within the document, including a visual application of a critique on a user interface presenting the document, based on the set of critiques, for the text in the document.

In Example 2, the subject matter of Example 1 includes, wherein receiving the information including the document type and determining the set of critiques are performed without user input and wherein the set of critiques are automatically activated without user input.

In Example 3, the subject matter of Examples 1-2 includes, wherein the set of critiques includes a generic critique applicable to all document types in addition to the critique specific to the document type.

In Example 4, the subject matter of Example 3 includes, wherein the set of critiques omits at least one generic critique.

In Example 5, the subject matter of Examples 1-4 includes, wherein the document type is a resume document type and wherein the critique specific to the document type is a first person reference critique, the first person reference critique corresponding only to the resume document type.

In Example 6, the subject matter of Examples 1-5 includes, wherein the set of critiques is generated based on past documents of the document type, including being based on at least one of expert analysis of the past documents, objective success of the past documents, or machine learning using the past documents.

In Example 7, the subject matter of Examples 1-6 includes, wherein the user interface includes a user selectable toggle to activate or deactivate the set of critiques, and wherein the user interface displays the document type.

Example 8 is a device for outputting document critiques, the device comprising: a processor to: receive information including a document type of a document, the document type identified based on text in the document; determine a set of critiques corresponding to the document type, the set of critiques automatically applied to the text in the document when activated and the set of critiques including a critique specific to the document type; output feedback for display in the document in response to the set of critiques being activated, the feedback including a visual application of a critique on a user interface presenting the document, based on the set of critiques, for the text in the document.

In Example 9, the subject matter of Example 8 includes, wherein to receive the information including the document type and to determine the set of critiques, the processor is to receive the information and determine the set of critiques without user input and wherein the set of critiques are automatically activated without user input.

In Example 10, the subject matter of Examples 8-9 includes, wherein the set of critiques includes a generic critique applicable to all document types in addition to the critique specific to the document type.

In Example 11, the subject matter of Example 10 includes, wherein the set of critiques omits at least one generic critique.

In Example 12, the subject matter of Examples 8-11 includes, wherein the document type is a resume document type and wherein the critique specific to the document type is a first person reference critique, the first person reference critique corresponding only to the resume document type.

In Example 13, the subject matter of Examples 8-12 includes, wherein the set of critiques is generated based on past documents of the document type, including being based on at least one of expert analysis of the past documents, objective success of the past documents, or machine learning using the past documents.

In Example 14, the subject matter of Examples 8-13 includes, wherein the user interface includes a user selectable toggle to activate or deactivate the set of critiques, and wherein the user interface displays the document type.

Example 15 is a machine-readable medium including instructions for displaying document critiques, which when executed by a processor, cause the processor to: receive information including a document type of a document, the document type identified based on text in the document; determine a set of critiques corresponding to the document type, the set of critiques automatically applied to the text in the document when activated and the set of critiques including a critique specific to the document type; provide feedback within the document in response to the set of critiques being activated, including a visual application of a critique on a user interface presenting the document, based on the set of critiques, for the text in the document.

In Example 16, the subject matter of Example 15 includes, wherein to receive the information including the document type and to determine the set of critiques, the instructions further cause the processor to receive the information and determine the set of critiques without user input and wherein the set of critiques are automatically activated without user input.

In Example 17, the subject matter of Examples 15-16 includes, wherein the set of critiques includes a generic critique applicable to all document types in addition to the critique specific to the document type and omits at least one generic critique.

In Example 18, the subject matter of Examples 15-17 includes, wherein the set of critiques is generated based on past documents of the document type, including being based on at least one of expert analysis of the past documents, objective success of the past documents, or machine learning using the past documents.

In Example 19, the subject matter of Examples 15-18 includes, wherein the document type is a resume document type and wherein the critique specific to the document type is a first person reference critique, the first person reference critique corresponding only to the resume document type.

In Example 20, the subject matter of Examples 15-19 includes, wherein the user interface includes a user selectable toggle to activate or deactivate the set of critiques, and wherein the user interface displays the document type.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method for displaying document critiques on a display device, the method comprising:
    determining, by a processor of the display device, a document type of a document, the document type identified based on text in the document;
    identifying a specific document content critique applicable only to the determined document type;
    identifying a generic document content critique applicable to at least two document types, including the document type, wherein the specific document content critique and the generic document content critique are distinct;
    determining, using the processor, conditions to automatically apply a set of critiques, corresponding to the document type, the set of critiques including the specific document content critique and the generic critique document content critique, wherein the set of critiques is generated based on past documents of the document type and includes one or more suggestions for adding, deleting, or editing text, or formatting the document;
    activating the set of critiques including the specific document content critique and the generic document content critique on text in the document; and
    providing, on a display of the display device, feedback within the document, including a visual application of the set of critiques on the document including the specific document content critique and the generic document content critique.

2. The method of claim 1, wherein determining the document type and determining the conditions to apply the set of critiques are performed without user input and wherein the set of critiques are automatically activated without user input.

3. The method of claim 1, wherein the generic critique is applicable to all document types.

4. The method of claim 1, wherein the set of critiques omits at least one generic critique from a set of generic critiques that includes the generic critique.

5. The method of claim 1, wherein the document type is a resume document type and wherein the critique specific to the document type is a first person reference critique, the first person reference critique corresponding only to the resume document type.

6. The method of claim 1, wherein the set of critiques is based on at least one of expert analysis of the past documents, objective success of the past documents, or machine learning using the past documents.

7. The method of claim 1, wherein the display of the display device includes a user interface including a user selectable toggle to activate or deactivate the set of critiques, and wherein the user interface displays the document type.

8. A device for outputting document critiques, the device comprising:
    a processor to:
        determine a document type of a document, the document type identified based on text in the document;
        identify a specific document content critique applicable only to the determined document type;
        identify a generic document content critique applicable to at least two document types, including the document type, wherein the specific document content critique and the generic document content critique are distinct;
        determine conditions to automatically apply a set of critiques corresponding to the document type, the set of critiques including the specific document content critique and the generic critique document content critique, wherein the set of critiques is generated based on past documents of the document type and includes one or more suggestions for adding, deleting, or editing text, or formatting the document;
        activate the set of critiques including the specific document content critique and the generic document content critique on text in the document; and
        output feedback for display in the document including a visual application of the set of critiques on the document including the specific document content critique and the generic document content critique.

9. The device of claim 8, wherein to determine the document type and to determine the conditions to apply the set of critiques is to determine the document type and determine the conditions to apply the set of critiques without user input and wherein the set of critiques are automatically activated without user input.

10. The device of claim 8, wherein the generic critique is applicable to all document types.

11. The device of claim 8, wherein the set of critiques omits at least one generic critique from a set of generic critiques that includes the generic critique.

12. The device of claim 8, wherein the document type is a resume document type and wherein the critique specific to the document type is a first person reference critique, the first person reference critique corresponding only to the resume document type.

13. The device of claim 8, wherein the set of critiques is based on at least one of expert analysis of the past documents, objective success of the past documents, or machine learning using the past documents.

14. The device of claim 8, wherein a display of the device includes a user interface including a user selectable toggle to activate or deactivate the set of critiques, and wherein the user interface displays the document type.

15. A non-transitory machine-readable medium including instructions for displaying document critiques, which when executed by a processor, cause the processor to:
    determine a document type of a document, the document type identified based on text in the document;
    identify a specific document content critique applicable only to the determined document type;
    identify a generic document content critique applicable to at least two document types, including the document type, wherein the specific document content critique and the generic document content critique are distinct;

determine conditions to automatically apply a set of critiques corresponding to the document type, the set of critiques including the specific document content critique and the generic critique document content critique, wherein the set of critiques is generated based on past documents of the document type and includes one or more suggestions for adding, deleting, or editing text, or formatting the document;

activate the set of critiques including the specific document content critique and the generic document content critique on text in the document; and provide feedback within the document, including a visual application of the set of critiques on the document including the specific document content critique and the generic document content critique.

16. The non-transitory machine-readable medium of claim 15, wherein the instructions further cause the processor to determine the document type and determine the conditions to apply the set of critiques automatically without user input.

17. The non-transitory machine-readable medium of claim 15, wherein the generic critique is applicable to all document types.

18. The non-transitory machine-readable medium of claim 15, wherein the set of critiques is based on at least one of expert analysis of the past documents, objective success of the past documents, or machine learning using the past documents.

19. The non-transitory machine-readable medium of claim 15, wherein the document type is a resume document type and wherein the critique specific to the document type is a first person reference critique, the first person reference critique corresponding only to the resume document type.

20. The non-transitory machine-readable medium of claim 15, wherein visual application of the set of critiques on the document includes a user selectable toggle to activate or deactivate the set of critiques, and wherein the visual application displays the document type.

* * * * *